US007001877B1

(12) United States Patent
Grier

(10) Patent No.: US 7,001,877 B1
(45) Date of Patent: Feb. 21, 2006

(54) ORGANIC LAUNDRY DETERGENT AND METHOD OF PRODUCING THE SAME

(76) Inventor: Carol A. Grier, 17201 E. 50th St., Yale, OK (US) 74085

( * ) Notice: Subject to any disclaimer, the term of this patent is extended or adjusted under 35 U.S.C. 154(b) by 434 days.

(21) Appl. No.: 10/402,648

(22) Filed: Mar. 28, 2003

Related U.S. Application Data

(60) Provisional application No. 60/369,026, filed on Apr. 1, 2002.

(51) Int. Cl.

| | |
|---|---|
| *C11D 14/02* | (2006.01) |
| *C11D 15/00* | (2006.01) |
| *D06L 14/02* | (2006.01) |
| *A01M 7/00* | (2006.01) |
| *A01N 25/00* | (2006.01) |

(52) U.S. Cl. ........................ 510/276; 510/461; 43/124; 504/116.1

(58) Field of Classification Search ................ 510/276, 510/420, 461, 470, 481
See application file for complete search history.

(56) References Cited

U.S. PATENT DOCUMENTS

| | | | | | |
|---|---|---|---|---|---|
| 1,875,530 | A | * | 9/1932 | Vaupotic | 514/783 |
| 1,992,202 | A | * | 2/1935 | Furman | 106/148.1 |
| 2,091,704 | A | * | 8/1937 | Duncan et al. | 510/127 |
| 2,278,352 | A | * | 3/1942 | Heald | 510/294 |
| 2,356,443 | A | * | 8/1944 | Bissinger | 510/353 |
| 2,376,499 | A | * | 5/1945 | Mosher | 510/454 |
| 2,386,954 | A | * | 10/1945 | Kalmar | 426/308 |
| 2,436,818 | A | * | 3/1948 | Musher | 424/49 |
| 2,545,357 | A | * | 3/1951 | Jayne, Jr. | 510/467 |
| 3,683,091 | A | * | 8/1972 | Nagata et al. | 514/680 |

* cited by examiner

*Primary Examiner*—Michael Barr
*Assistant Examiner*—John M Petruncio
(74) *Attorney, Agent, or Firm*—Martin G. Ozinga; Phillips McFall McCaffrey McVay & Murrah, P.C.

(57) ABSTRACT

The present invention is a laundry detergent or powder and method of making the same utilizing natural components such as but not limited to milk, beeswax, sodium hydroxide or lye, vegetable or soy oil, sugar, baking soda, and corn starch. It is still further contemplated that the invention may include a borate mineral from the subclass of carbonates as well as other variants such as but not limited to flour. Furthermore, the invention may be utilized for an herbicide, pesticide, bath soap, or other general cleaning product.

5 Claims, 1 Drawing Sheet

ORGANIC LAUNDRY DETERGENT AND METHOD OF PRODUCING THE SAME

CROSS-REFERENCE TO RELATED APPLICATIONS

Figure 1:
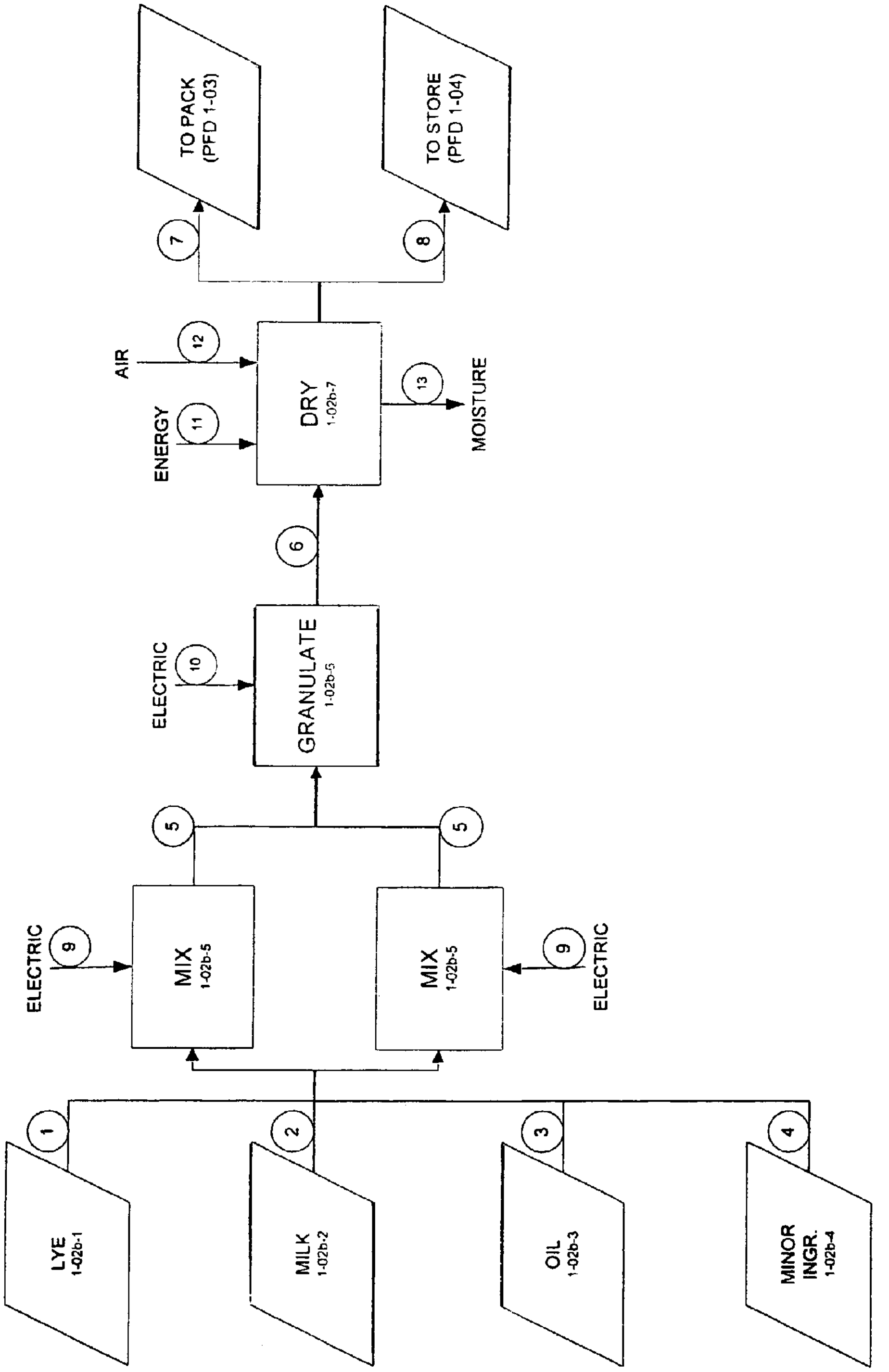

Priority is claimed from provisional application U.S. Ser. No. 60/369,026 filed on Apr. 1, 2002, and incorporated by reference herein.

BACKGROUND OF THE INVENTION

1. Field of the Invention

The present invention relates generally to laundry detergents also known as laundry powders. More particularly, the present invention is an environmentally friendly organic laundry detergent and method for producing the same utilizing ingredients such as but not limited to milk, beeswax, lye, soy or vegetable oil, baking soda, corn starch, sugar and a borate. It is further contemplated that the invention may be use as an herbicide and/or pesticide.

2. Prior Art

As the world population continues to grow and natural resources diminish, there is an ever increasing need for environmentally friendly consumer products. Specifically, cleaning products such as soaps and detergents, which are used in conjunction with water, have become a greater global concern.

Considering the large amount of water proportionally used in laundry and laundry services, conventional detergent products can create harmful results in the environment due to the difficulties associated with removing the harmful elements in the detergent through conventional water treatment facilities. Likewise, in certain geographical areas such as desert regions, water is a relatively scarce commodity which further exacerbates concerns of ecological recapturing and treatment.

Furthermore, in locations where water treatment facilities are lacking, water runoff is uncontrolled or septic systems are prevalent, conventional detergents often find their way to water sources such as rivers, wells, lakes and oceans where the chemicals used in these detergents may have disastrous environmental impacts to ecological systems. Of note, some of these harmful chemicals found in conventional laundry detergents can take decades to break down to a benign nature.

Still furthermore, many conventional laundry detergents require large industrial manufacturing systems for the production and refinement of the various chemicals used. Such facilities are typically costly and often environmentally unfriendly due to the fact they take considerable energy and produce pollution in the process. These plants, due to the size, cost, and zoning restraints inherent with chemical manufacturing in industrially developed countries, are generally located at large distances from the consuming public which require extensive transportation costs. Obviously, transportation is often environmentally unfriendly and adds costs to the finished products.

As the world's natural resources diminish and ecological systems become more fragile, there is an ever increasing need for an alternative to conventional laundry detergents and the harmful byproducts they produce in water systems. Although many of the prior art attempts to produce environmentally friendly detergents have reduced some of the harmful components, there has not been a practical or viable product that meets consumer demands until the current invention.

SUMMARY OF THE INVENTION

In view of the foregoing disadvantages inherent in the known types of laundry detergents now present in the prior art, the present invention provides an environmentally friendly organic laundry detergent and method for producing the same which meets consumer performance demands and reduces the harmful effects associated with laundry detergents. As such, the general purpose of the present invention, which will be described subsequently in greater detail, is to provide a new and improved organic laundry detergent which has all the advantages of the prior art and none of the disadvantages.

To attain this, the present invention essentially comprises a laundry detergent or powder utilizing natural components such as but not limited to milk, beeswax, lye, vegetable or soy oil, sugar, flour, baking soda, and corn starch. It is still further contemplated that the invention may include a borate mineral from the subclass of carbonates as well as other variants. Furthermore, the basic composition of the invention may be adjusted such that it may be utilized for an herbicide, pesticide, bath soap, or other general cleaning product. It is also understood that the invention may be made from some of the above listed ingredients and not necessarily include all the listed ingredients.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved organic laundry detergent and method of producing the same which may be easily and efficiently manufactured.

It is a further object of the present invention to provide a new and improved organic laundry detergent and method of producing the same which is environmentally friendly such that harmful chemicals are not utilized.

An even further object of the present invention is to provide a new and improved organic laundry detergent and method of producing the same which is susceptible to a low cost of manufacture with regard to both components and labor, and which accordingly is then susceptible to low prices of sale to the consuming public, thereby making such economically available.

Still another object of the present invention is to provide a new and improved organic laundry detergent and method of producing the same which provides all of the advantages of the prior art, while simultaneously overcoming some of the disadvantages normally associated therewith.

Another object of the present invention is to provide a new and improved organic laundry detergent and method of producing the same which may further be used as bath soap or other general cleaning products.

Yet another object of the present invention is to provide a new and improved organic laundry detergent and method of producing the same which may further be used as a general herbicide or pesticide.

An even further object of the present invention is to provide a new and improved organic laundry detergent and method of producing the same which reduces or eliminates the cure and drying process other conventional methods require for lye soap making.

It is a further object of the present invention to provide a new and improved organic laundry detergent and method of producing the same which reduces water treatment and is therefore more readily utilized in geographic regions where water may be in short or limited supply.

An even further object of the present invention is to provide a new and improved organic laundry detergent and method of producing the same which may be manufactured more locally than the existing prior art therefore reducing transportation costs associated therewith as well as reduce pollution in general.

These, together with other objects of the invention, along with the various features of novelty which characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there are illustrated preferred embodiments of the invention.

BRIEF DESCRIPTION OF THE DRAWING OR DRAWINGS

FIG. 1 is a process diagram generally depicting a preferred embodiment of a method in accordance with the present invention.

DETAILED DESCRIPTION OF THE PREFERRED EMBODIMENTS

In general, the present invention is a laundry detergent or laundry powder that utilizes environmental friendly organic components and method of making the same. It is further contemplated the invention may also be used as an herbicide and/or pesticide. In a preferred embodiment, the invention generally comprises milk, beeswax, a sodium hydroxide also more commonly known as lye, soy or vegetable oil, sugar, baking soda, corn starch, and a borate. It is still further contemplated that flour may be utilized.

The following examples of preferred embodiments and construction are defined as parts and percentages by weight unless otherwise indicated and introduce a change in the examples from percent to parts by weight.

In a preferred embodiment, the invention generally comprises:

about 14.85% goat milk;
about 0.32% beeswax;
about 38.34% sodium hydroxide or lye;
about 23.16% soy or vegetable oil;
about 7.03% sugar;
about 5.11% baking soda;
about 5.11% corn starch; and
about 6.07% borate.

In the preferred embodiment above, the invention generally utilizes about 1½ gallons of goat milk, about 4 ounces of beeswax, about 30 pounds of sodium hydroxide commonly referred to as lye, about 2½ gallons soy or vegetable oil, about 5 pounds 8 ounces of sugar, about 4 pounds baking soda, about 4 pounds corn starch, about 4 pounds 12 ounces of a borate. It is understood that the amounts may be greater or less than that specified and percentages per pound may vary.

It is still further understood that other types of milk, such as but not limited to cow, may also be utilized. It is still further contemplated that dried milk powder may be used instead of or in conjunction with milk in a liquid form.

Furthermore, it is understood that the oil used may be but is not limited to soy or vegetable oil. It is contemplated that other types of oil may be utilized that are generally organic in nature.

Still further, it is contemplated that a borate may be utilized in a preferred embodiment. It is understood that borates in general are a subclass of the mineral class of carbonates. In a preferred embodiment the borate may be borax, a hydrated sodium borate.

In another preferred embodiment, flour may be utilized wherein invention may comprise:

about 9.83% goat milk;
about 0.21% beeswax;
about 25.37% sodium hydroxide or lye;
about 15.33% soy or vegetable oil;
about 4.65% sugar;
about 33.83% flour;
about 3.38% baking soda;
about 3.38% corn starch; and
about 4.02% borate.

In the preferred embodiment above, the invention generally utilizes about 1½ gallons of goat milk, about 4 ounces of beeswax, about 30 pounds of sodium hydroxide commonly referred to as lye, about 2½ gallons soy or vegetable oil, about 5 pounds 8 ounces of sugar, about 34 pounds of flour, about 4 pounds baking soda, about 4 pounds corn starch, about 4 pounds 12 ounces of a borate. It is understood that the amounts may be greater or less than that specified and percentages per pound may vary.

EXAMPLES

The following examples further illustrate embodiments of the present invention including preferred versions and methods of making the same; however, these examples are not to be construed as limitations of this invention.

Example 1

A preferred method of manufacture generally includes mixing the relatively liquid or soft ingredients such as the milk, beeswax, sodium hydroxide, and oil first. At trace or thickening, add dry ingredients such as but not limited to sugar, baking soda, corn starch, and borate. It is contemplated that the adding of the dry components may generally stop the chemical reaction. It is further contemplated that a preferred embodiment includes mixing in flour with the generally dry ingredients.

The ingredients may be mixed in a blender with a preferred embodiment of mixing until the mix substance becomes powder. The time for blending may be but is not limited to about 30 minutes. A preferred temperature for mixing may be but is not limited to about 60° F. or less. It is understood mixing time and temperature may be greater or less than that specified.

The powder mix substance is then generally placed in a dryer/grinder such as but not limited to the brand sold under the trademark VORTEX. When the powder mix substance is of a general consistency of fine flour and dries to about 1% moisture, it may then be weighed and packaged. It is understood that the percentage of moisture in the end product may be greater or less than 1%.

Example 2

In another preferred embodiment of the invention, the drying and curing may be eliminated. A preferred method of manufacture still generally includes mixing the milk, beeswax, sodium hydroxide, and oil first. At trace or thickening, add dry ingredients of sugar, baking soda, corn starch, and borate. It is further contemplated that a preferred embodiment includes mixing in flour with the generally dry ingredients.

The ingredients may be mixed in a blender such as but not limited to a ribbon blender with a preferred embodiment of mixing until the mix substance becomes powder. The time for blending may be but is not limited to about 30 minutes. A preferred temperature for mixing may be but is not limited to about 60° F. or less. It is understood mixing time and temperature may be greater or less than that specified.

The powder mix substance is then generally placed in a hammer mill type grinder. When the powder mix substance is of a general consistency of fine flour, it may then be weighed and packaged.

Example 3

In still another preferred embodiment of the invention, the components still generally include mixing the milk, beeswax, sodium hydroxide, and oil first. At trace or thickening, add dry ingredients of sugar, baking soda, corn starch, and borate. It is further contemplated that a preferred embodiment includes mixing in flour with the generally dry ingredients.

The mixture is then placed into a mold. The mixture is dried and cooled at room temperatures with a stream of air at ambient temperatures of 320 and 60° F. applied to surface of molds. In a preferred embodiment, drying and cooling may occur for about 12 hours. It is understood that the time may be greater or less and is not limited to about 12 hours.

The molds are then cut into pieces. The cut pieces are then generally dried and cooled at room temperatures with a stream of air at ambient temperatures of 32° and 60° F. applied to surface of cut pieces. In a preferred embodiment, drying and cooling may occur for about 6 hours. It is understood that the time may be greater or less and is not limited to about 6 hours. The pieces are then generally crushed.

The crushed pieces are then generally dried and cooled at room temperatures with a stream of air at ambient temperatures of 32° F. and 60° F. applied to surface of crushed pieces. In a preferred embodiment, drying and cooling may occur for about 12 hours. It is understood that the time may be greater or less and is not limited to about 12 hours.

In a preferred embodiment, the crushed pieces are rotated such that the surfaces of the crushed pieces generally receive contact with the stream of cooled air. Furthermore, the crushed pieces may then be melted with a solvent.

Example 4

Now referring to the drawing, another preferred embodiment is generally depicted illustrating in a general flow chart a method for making an environmentally organic laundry detergent, herbicide, and/or pesticide.

Whereas, the present invention has been described in relation to the drawing attached hereto, it should be understood that other and further modifications, apart from those shown or suggested herein, may be made within the spirit and scope of this invention.

Changes may be made in the construction and the operation of various components, elements and assemblies described herein or in the steps or the sequence of steps of the methods described herein without departing from the spirit and scope of the invention as defined in the following claims.

What is claimed is:

1. A composition for use as an organic laundry detergent or powder, organic herbicide or organic pesticide comprising:

about 9.83% to about 14.85% milk by weight,
about 0.21% to about 0.32% beeswax by weight,
about 25.37% to about 38.34% sodium hydroxide by weight,
about 15.33% to about 23.16% vegetable oil by weight,
about 4.65% to about 7.03% sugar by weight,
about 3.38% to about 5.11% baking soda by weight,
about 3.38% to about 5.11% corn starch by weight, and
about 4.02% to about 6.07% borate by weight.

2. The composition of claim 1 having:

about 14.85% goat milk by weight;
about 0.32% beeswax by weight;
about 38.34% sodium hydroxide by weight;
about 23.16% oil by weight;
about 7.03% sugar by weight;
about 5.11% baking soda by weight;
about 5.11% corn starch by weight; and
about 6.07% borate by weight.

3. The organic laundry detergent of claim 1 wherein said oil is soy oil.

4. The composition of claim 1 further including flour.

5. The composition of claim 4 having:

about 9.83% goat milk by weight;
about 0.21% beeswax by weight;
about 25.37% sodium hydroxide by weight;
about 15.33% oil by weight;
about 4.65% sugar by weight;
about 33.83% flour by weight;
about 3.38% baking soda by weight;
about 3.38% corn starch by weight; and
about 4.02% borate by weight.

* * * * *